United States Patent
Kato et al.

(10) Patent No.: US 10,457,160 B2
(45) Date of Patent: Oct. 29, 2019

(54) POWER CONTROL DEVICE FOR VEHICLE

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Ryoji Kato, Tokyo (JP); Koji Ichikawa, Okazaki (JP); Masashi Takahashi, Tokyo (JP); Kazuyoshi Nakane, Tokyo (JP); Kazuhito Kawashima, Tokyo (JP); Tetsuya Watanabe, Tokyo (JP); Keisuke Tashiro, Tokyo (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-Shi, Aichi (JP)

(*) Notice: Subject to any disclaimer, the term of this patent is extended or adjusted under 35 U.S.C. 154(b) by 105 days.

(21) Appl. No.: 15/475,392

(22) Filed: Mar. 31, 2017

(65) Prior Publication Data
US 2017/0203669 A1 Jul. 20, 2017

Related U.S. Application Data

(63) Continuation of application No. PCT/JP2015/058559, filed on Mar. 20, 2015.

(51) Int. Cl.
*B60L 58/30* (2019.01)
*H01M 8/04302* (2016.01)
(Continued)

(52) U.S. Cl.
CPC .............. *B60L 58/30* (2019.02); *B60L 58/12* (2019.02); *B60L 58/40* (2019.02);
(Continued)

(58) Field of Classification Search
CPC ......... H01M 8/04302; H01M 8/04597; H01M 2220/20; H01M 16/006; H01M 8/04932;
(Continued)

(56) References Cited

U.S. PATENT DOCUMENTS 5,874,823 A * 2/1999 Suzuki .................. H02J 7/0014
320/125
9,337,504 B2 * 5/2016 Araki ................ H01M 8/04552
(Continued)

FOREIGN PATENT DOCUMENTS

CN 106132797 A 11/2016
JP 2000-32606 A 1/2000
(Continued)

*Primary Examiner* — Alfonso Perez Borroto
*Assistant Examiner* — Esayas G Yeshaw
(74) *Attorney, Agent, or Firm* — Birch, Stewart, Kolasch & Birch, LLP

(57) ABSTRACT

In a power control device for a vehicle in which an electric motor for driving the vehicle to travel is supplied with power from a battery mounted on the vehicle and a fuel cell, a control unit sets a target charging rate (SOCt) of the battery in such a manner that the target charging rate decreases as a remaining fuel amount (Qf) of the fuel cell decreases after the power generation of the fuel cell is started during high-output/high-speed travelling and controls a power generation output (Pf) of the fuel cell based on a difference between the target charging rate (SOCt) and a current charging rate (SOC).

6 Claims, 2 Drawing Sheets

(51) Int. Cl.
*H01M 8/04082* (2016.01)
*H01M 8/04858* (2016.01)
*H01M 16/00* (2006.01)
*H01M 8/0438* (2016.01)
*H01M 8/04537* (2016.01)
*B60L 58/12* (2019.01)
*B60L 58/40* (2019.01)
*B60K 15/03* (2006.01)
*B60L 53/14* (2019.01)

(52) U.S. Cl.
CPC ..... *H01M 8/0438* (2013.01); *H01M 8/04201* (2013.01); *H01M 8/04302* (2016.02); *H01M 8/04597* (2013.01); *H01M 8/04932* (2013.01); *H01M 16/006* (2013.01); *B60K 15/03006* (2013.01); *B60K 2015/03315* (2013.01); *B60L 53/14* (2019.02); *B60L 2210/14* (2013.01); *B60L 2210/30* (2013.01); *H01M 2220/20* (2013.01); *H01M 2250/20* (2013.01); *H01M 2250/402* (2013.01); *Y02T 10/705* (2013.01); *Y02T 10/7044* (2013.01); *Y02T 10/7072* (2013.01); *Y02T 10/7225* (2013.01); *Y02T 10/7241* (2013.01); *Y02T 90/127* (2013.01); *Y02T 90/14* (2013.01); *Y02T 90/32* (2013.01); *Y02T 90/34* (2013.01)

(58) Field of Classification Search
CPC ........ H01M 8/04201; H01M 2250/402; B60L 2210/14; B60L 11/1881; B60L 11/1861; B60L 11/1816; B60L 2210/30; B60K 2015/03315; B60K 15/03006
See application file for complete search history.

(56) References Cited

U.S. PATENT DOCUMENTS

| | | | |
|---|---|---|---|
| 2001/0052760 A1* | 12/2001 | Amano | B60K 6/485 320/163 |
| 2010/0058730 A1* | 3/2010 | Sonoda | F01D 21/14 60/39.12 |
| 2011/0053014 A1* | 3/2011 | Yumita | H01M 8/04097 429/415 |
| 2011/0064976 A1 | 3/2011 | Shimoda | |
| 2012/0003555 A1* | 1/2012 | Mitsui | H01M 8/04626 429/428 |
| 2012/0098502 A1* | 4/2012 | Hori | B60W 10/26 320/162 |
| 2012/0107709 A1* | 5/2012 | Mori | B60L 11/1887 429/428 |
| 2013/0066615 A1* | 3/2013 | Morgan | G05B 13/048 703/7 |
| 2013/0157161 A1* | 6/2013 | Matsusue | H01M 8/04291 429/442 |
| 2013/0341934 A1* | 12/2013 | Kawanishi | B60L 8/00 290/1 A |
| 2016/0153417 A1* | 6/2016 | Tochigi | F02D 17/04 123/339.24 |
| 2017/0101023 A1 | 4/2017 | Nawata et al. | |

FOREIGN PATENT DOCUMENTS

| | | |
|---|---|---|
| JP | 2002-58111 A | 2/2002 |
| JP | 2004-320946 A | 11/2004 |
| JP | 2006-296106 A | 10/2006 |
| JP | 2009-29154 A | 2/2009 |
| JP | 2010-173360 A | 6/2010 |
| JP | 5101583 B2 | 12/2012 |
| JP | 2013-75615 A | 4/2013 |
| WO | WO 2011/070746 A1 | 6/2011 |

* cited by examiner

POWER CONTROL DEVICE FOR VEHICLE

CROSS REFERENCE TO RELATED APPLICATIONS

This application is a Continuation of PCT International Application No. PCT/JP2015/058559, filed on Mar. 20, 2015, the entirety of which is hereby expressly incorporated by reference into the present application.

BACKGROUND OF THE INVENTION

Field of the Invention

The present invention relates to a power generation control technique for a power generation unit mounted on a vehicle that is driven to travel by an electric motor.

Description of the Related Art

In electric vehicles that travel by driving an electric motor using power supplied from an on-vehicle battery, a vehicle incorporating a range extender serving as a power generation unit has been developed. The range extender is composed of, for example, a generator and a small engine dedicated to power generation. The generated power is supplied to the electric motor and used for charging the on-vehicle battery, thereby making it possible to increase the range of the electric vehicle.

Incidentally, progress has been made in the development of fuel cells recently and vehicles incorporating fuel cells have been proposed. Further, a vehicle using a fuel cell instead of an engine as a range extender for the electric vehicle has been proposed.

For example, Patent Document (Japanese Patent No. 5101583) discloses that in a vehicle incorporating a fuel cell, the fuel cell and a battery are used as a power supply source to supply power to an electric motor, so that drive wheels can be driven for travelling. Further, the Patent Document discloses a technique for controlling the output of the fuel cell so as to maintain a charging rate (SOC) of the battery at a target charging rate, which is set to a value close to a lower limit, after the power of the battery is used.

In the vehicle disclosed in the Patent Document described above, power is supplied from the battery to the electric motor until the battery charging rate reaches the target charging rate, and when the battery charging rate is decreased to a value lower than the target charging rate, the output from the fuel cell is controlled based on the difference between the present changing rate of the battery and the target charging rate thereof so that the power used for the electric motor and the like is provided and the target charging rate is maintained.

However, in general, when the output of a fuel cell increases, the efficiency of the output decreases. Even when the generator for driving the engine is used instead of the fuel cell, the range of an efficient rotational speed of the engine is limited. Accordingly, like in the Patent Document, when the power generation output of the power generation unit is set based on the charging rate and the target charging rate after the target charging rate is reached, the power generation unit need to output enough power for the vehicle power consumption, and when the power consumption of the vehicle is high, such as during high-speed travelling, it is necessary to increase the output from the fuel cell. This may deteriorate the efficiency of the power generation unit. Since the fuel of the power generation unit mounted on the vehicle is limited, the deterioration in the efficiency of the power generation unit results in a reduction in the range of the vehicle.

SUMMARY OF THE INVENTION

The present invention has been made to solve the above-mentioned problems, and an object of the present invention is to provide a power control device for a vehicle that controls a power generation unit, such as a fuel cell, to output power efficiently, and increase a range of the vehicle.

In order to attain the above-mentioned object, a power control device for a vehicle according to the present invention is a power control device for a vehicle in which an electric motor for driving the vehicle to travel is supplied with power from a battery and a power generation unit configured to consume fuel to generate power, the power control device including: a remaining fuel amount detection unit configured to detect a remaining fuel amount of the power generation unit; a power generation start determination unit configured to perform a power generation start determination of the power generation unit; a power generation control unit configured to control a power generation output of the power generation unit; and a charging rate detection unit configured to detect a current charging rate of the battery. The power generation control unit sets a target charging rate of the battery in such a manner that the target charging rate decreases as the remaining fuel amount decreases after the power generation start determination is performed, and controls the power generation output based on a difference between the target charging rate and the current charging rate.

According to a power control device for a vehicle according to the present invention, the target charging rate decreases as the remaining fuel amount of the power generation unit decreases. Accordingly, the target charging rate is set in such a manner that the target charging rate gradually decreases in accordance with the actuation of the power generation unit. Thus, consumption of the fuel and decrease in the charging rate of the battery progress simultaneously after the power generation start determination is performed, so that a time required for power generation can be secured and the power generation output can be suppressed. Thus, since power can be generated with a suppressed power generation output, the power generation efficiency of the power generation unit can be improved and the amount of power that can be generated with a limited fuel supply can be increased. Consequently, the range of the vehicle can be increased.

The power generation output of the power generation unit is controlled based on the difference between the target charging rate of the battery and the current charging rate. Accordingly, the control can be accurately performed so that the charging rate of the battery matches the target charging rate of the battery that is set based on the remaining fuel amount.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Embodiments of the present invention will be described below with reference to the drawings.

Figure 1:
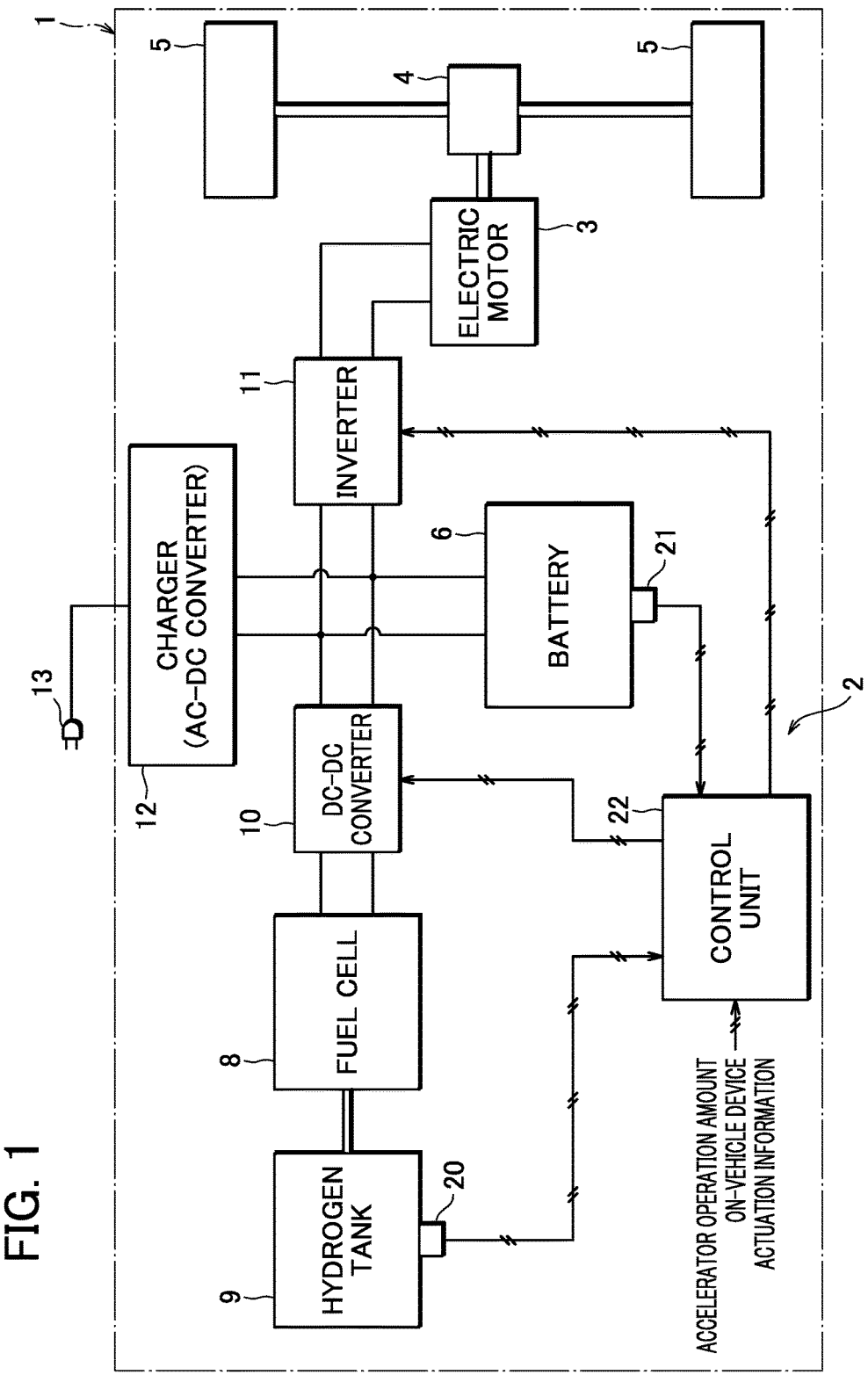
FIG. 1 is a schematic block diagram of a drive system of an electric vehicle according to an embodiment of the present invention.

FIG. 1 is a schematic block diagram showing a drive system of a vehicle 1 according to an embodiment of the present invention.

The vehicle 1 incorporating a power control device 2 according to an embodiment of the present invention is an electric vehicle including right and left travel wheels 5 that are driven for travelling by an electric motor 3 via a differential gear 4.

The vehicle 1 incorporates a battery 6 and a fuel cell 8 as a power supply device for supplying power to the electric motor 3 for driving the vehicle to travel.

The fuel cell 8 generates power using hydrogen stored in a fuel tank 9, which is mounted on the vehicle, as fuel. The power generated by the fuel cell 8 is supplied to the primary side of a DC-DC converter 10 and is boosted, so that the power can be supplied to the electric motor 3 via an inverter 11 from the secondary side of the DC-DC converter 10. Further, the power can be supplied to the electric motor 3 via the inverter 11 by the battery 6.

The fuel cell 8 and the battery 6 are connected in parallel via the DC-DC converter 10, surplus power of the power that is output from the fuel cell 8 is supplied to the battery 6 and the battery 6 is charged with the power. Further, when the power that is output from the power generation unit 7 as power necessary for driving the electric motor 3 is insufficient, power is supplied from the battery 6.

A charger 12 is mounted on the vehicle 1. The charger 12 is an AC-DC converter, which is capable of converting an AC voltage supplied from an external power supply via a plug 13 into a DC voltage, supplying power to the battery 6, and charging the battery 6 with the supplied power.

The fuel tank 9 includes a remaining fuel amount detector 20 (remaining fuel amount detection unit) that detects a remaining fuel amount (hydrogen remaining amount). The battery 6 includes a battery monitoring unit 21 (charging rate detection unit) that monitors a charging rate of the battery 6.

The control unit 22 (power generation start determination unit, power generation control unit) includes a CPU (central processing unit), a storage device (ROM, RAM), and an input/output interface. The control unit 22 receives the remaining fuel amount of the fuel tank 9 from the remaining fuel amount detector 20, the charging rate of the battery 6 from the battery monitoring unit 21, and other vehicle operation information including the accelerator operation amount of the vehicle 1 and actuation information about on-vehicle equipment, such as an air conditioner, performs actuation control of the electric motor 3 via the inverter 11, and performs output control of the fuel cell 8 via the DC-DC converter 10.

The control unit 22 performs a power generation start determination for determining a high-output/high-speed travelling state of the vehicle 1 during vehicle travelling (power generation start determination unit). The control unit 22 sequentially calculates the vehicle power consumption by adding up the power consumption of the electric motor 3 and the power consumption of other on-vehicle equipment, i.e., the power supplied from the battery, and smoothes the vehicle power consumption using a filter or the like, thereby calculating a vehicle speed change equivalent value. Further, when the vehicle speed change equivalent value continuously exceeds a predetermined threshold Va, which is preliminarily set, for a predetermined period Ta or longer, it is determined that the vehicle 1 is in the high-output/high-speed travelling state and the power generation is started (power generation start determination). Note that the predetermined threshold Va and the predetermined period Ta may be set, as needed, to a value with which the high-output/high-speed travelling state in which the efficiency of the output from the fuel cell 8 decreases can be determined. Further, even if the vehicle power consumption does not continuously exceed the threshold Va for the predetermined period Ta or longer, when the charging rate of the battery 6 reaches an attainment target charging rate SOCb, which is described later, the power generation start determination is performed at the time.

The control unit 22 further calculates and controls a power generation output Pf of the fuel cell 8 every predetermined calculation cycle (for example, several msec) after the power generation start determination is performed (power generation control unit). The power generation output Pf is calculated by the following Expression (1).

$$Pf = \alpha \times (SOCt - SOC) \quad (1)$$

In Expression (1), SOC represents a current charging rate of the battery 6 that is input from the battery monitoring unit 21, and SOCt represents a target charging rate. The calculation is performed every predetermined calculation cycle by Expression (1) as well as the following Expression (2). α represents an output gain. For example, the output gain α is set in such a manner that when the charging rate SOC is higher than the target charging rate SOCt, α becomes 0, and when the charging rate SOC is lower than the target charging rate SOCt, the output gain α increases in accordance with an increase in the difference between the target charging rate SOCt and the charging rate SOC.

$$SOCt = SOCb + (SOCa - SOCb) \times \{(Qf - Qfb)/(Qfa - Qfb)\} \quad (2)$$

In Expression (2), SOCa represents a start charging rate, and the charging rate of the battery 6 that is obtained when the power generation start determination is performed is stored and used. SOCb represents an attainment target charging rate. The attainment target charging rate SOCb is the charging rate of the battery 6 that is required at least when travelling of the vehicle 1 ends. For example, SOCb is set to a positive value that is close to 0. Qf represents a present remaining fuel amount input from the remaining fuel amount detector 20. Qfa represents a start remaining fuel amount. As the start remaining fuel amount Qfa, the remaining fuel amount obtained when the power generation start determination is performed is stored and used. Qfb represents an attainment target remaining fuel amount. The attainment target remaining fuel amount Qfb is the remaining amount of the fuel required at least when travelling of the vehicle 1 ends. The attainment target remaining fuel amount Qfb is set to, for example, a positive value close to 0.

Figure 2:
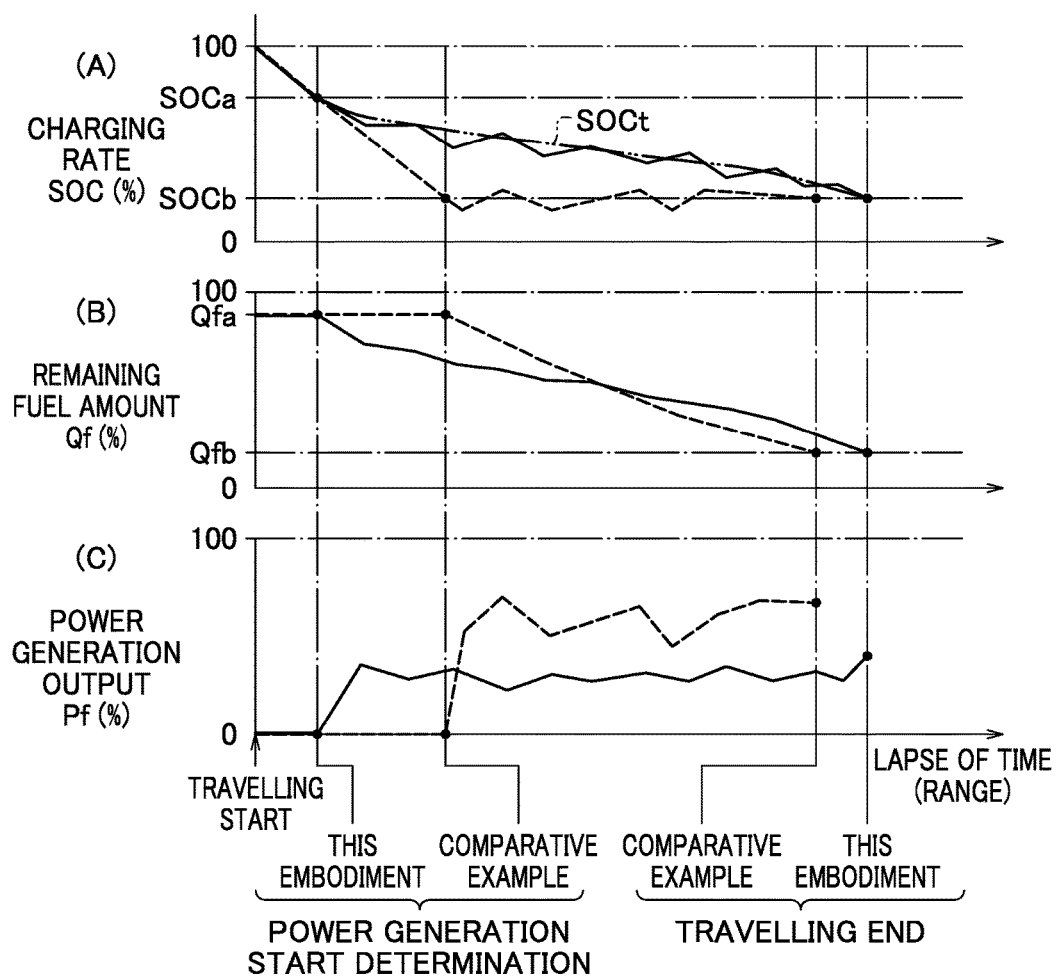
FIG. 2 are graphs showing an example of a transition of a battery charging rate, a remaining fuel amount, and a power generation output during travelling of the vehicle according to this embodiment.

FIG. 2 are graphs showing an example of a transition of a battery charging rate SOC, a remaining fuel amount Qf, and a power generation output Pf during vehicle travelling according to this embodiment.

In FIG. 2, (A) shows a transition of the charging rate SOC of the battery 6; (B) shows a transition of the remaining fuel amount Qf; and (C) shows a transition of the power generation output Pf of the fuel cell 8, from a state in which the charging rate SOC of the battery 6 is 100% and the remaining fuel amount is the value Qfa close to 100% until travelling of the vehicle 1 is started and the vehicle travels as far as possible. In FIG. 2, a solid line indicates this embodiment in which the power generation output Pf is set using the above-mentioned Expressions (1) and (2), and a dashed line indicates a transition in Comparative Example. An alternate long and two short dashes line in FIG. 2(A) indicates a transition of the target charging rate SOCt set in this embodiment.

In Comparative Example shown in FIG. 2, the electric motor 3 is driven using only the power supplied from the battery 6 until the charging rate SOC of the battery 6 reaches the attainment target charging rate SOCb, and power is supplied from the fuel cell 8 based on the difference between the current charging rate SOC and the attainment target charging rate SOCb so that the attainment target charging rate SOCb is maintained after the charging rate has reached the attainment target charging rate SOCb.

On the other hand, in this embodiment, as described above, even if the charging rate SOC of the battery 6 does not decrease to the attainment target charging rate SOCb, when the vehicle 1 comes into the high-output/high-speed travelling state and the vehicle power consumption continuously exceeds the threshold Va for the predetermined period Ta or longer, the power generation start determination is performed and the power generation of the fuel cell 8 is started. Accordingly, in the high-output/high-speed travelling state, the power generation is started earlier than in Comparative Example. Thus, since the power generation is started earlier, the output of the fuel cell 8 can be suppressed and an insufficient amount of power for the vehicle power consumption is supplemented with the output from the battery 6.

After the power generation is started, the target charging rate SOCt is set in such a manner that the target charging rate SOCt decreases as the remaining fuel amount Qf decreases, and the target charging rate SOCt is set in such a manner that remaining fuel amount Qf reaches the attainment target remaining fuel amount Qfb and the target charging rate SOCt reaches the attainment target charging rate SOCb simultaneously. Further, the power generation output Pf is calculated based on the difference between the target charging rate SOCt and the current charging rate SOC. Accordingly, feedback control is accurately performed so that the charging rate SOC matches the target charging rate SOCt.

The target charging rate SOCt gradually decreases as the remaining fuel amount Qf decreases, and the control is performed in such a manner that the attainment target charging rate SOCb is reached at the same time when the remaining fuel amount Qf reaches the attainment target remaining fuel amount Qfb. Accordingly, in practice, the charging rate SOC of the battery 6 reaches the attainment target charging rate SOCb substantially at the same time when the remaining fuel amount Qf reaches the attainment target remaining fuel amount Qfb in accordance with the target charging rate SOCt. Therefore, the travel distance of the vehicle 1 from the state where the charging rate of the battery 6 is 100% and the remaining fuel amount is the start remaining fuel amount Qfa until the charging rate SOCa and the remaining fuel amount Qfb are reached corresponds the range at which maximum travelling can be achieved. Further, in this embodiment, power is output from the fuel cell 8 until the remaining fuel amount Qf reaches the attainment target remaining fuel amount Qfb, and the target charging rate SOCt is gradually reduced as the remaining fuel amount Qf decreases. Consequently, a time required for power generation from the power generation start to the end of travelling can be secured and the output of the fuel cell 8 can be suppressed.

In Comparative Example, after the power generation start, the charging rate SOC of the battery 6 has already reached the attainment target charging rate SOCb, which makes it difficult to increase the output from the battery 6. Accordingly, when the vehicle power consumption is greatly increased, it is necessary to greatly increase the output from the fuel cell 8 in accordance with the increase in the vehicle power consumption. On the other hand, in this embodiment, in the period from the power generation start to the end of travelling, the charging rate SOC exceeds the attainment target charging rate SOCb. Therefore, even when the vehicle power consumption is temporarily increased, the output from the battery 6 is increased, so that a fluctuation in the output from the fuel cell 8 can be suppressed.

As described above, in this embodiment, in the high-output/high-speed travelling state, charging is started earlier and the target charging rate SOCt is reduced in accordance with the decrease in the remaining fuel amount Qf until the remaining fuel amount Qf reaches the attainment target remaining fuel amount Qfb, thereby making it possible to secure a time required for power generation and suppress the output of the fuel cell 8 to a certain level. The output efficiency of the fuel cell 8 is generally reduced as the output is increased. Accordingly, the output efficiency of the fuel cell 8 is improved by suppressing the output of the fuel cell 8. Further, since the fluctuation in the output of the fuel cell 8 can be suppressed with respect to a fluctuation in the vehicle power consumption, the output efficiency of the fuel cell 8 can be improved also in this respect.

Thus, for example, in a status where the high-output/high-speed travelling state continues, like when the vehicle travels on a freeway, the fuel cell 8 can be caused to generate power efficiently, which makes it possible to suppress the fuel consumption and increase the range of the vehicle.

Note that in a low-output/low-speed travelling state, the power generation start determination is not performed earlier and the power generation is started after the charging rate SOC of the battery 6 has reached the attainment target charging rate SOCb, like in Comparative Example. However, since the power consumption of the electric motor 3 is small in the low-output/low-speed travelling state, there is no need to increase the output of the fuel cell 8. Consequently, deterioration in the efficiency of the fuel cell 8 can be suppressed.

Further, in this embodiment, the power generation start determination is performed based on the vehicle speed equivalent value calculated by smoothing the vehicle power consumption. When the vehicle speed equivalent value exceeds the threshold Va for the predetermined period Ta or longer, it is determined that the vehicle 1 is in the high-output/high-speed travelling state and the power generation is started. On the other hand, when it is determined that, for example, the vehicle speed itself is equal to or higher than the threshold and the vehicle is in the high-output/high-speed travelling state, the vehicle speed fluctuates on an uphill, a downhill, or the like even if the output is constant. Accordingly, it is difficult to accurately determine the high-output/high-speed travelling state of the vehicle. In a case where it is simply determined that the vehicle in the high-output/high-speed travelling state when the vehicle power consumption is equal to or higher than the threshold, the vehicle power consumption is greatly fluctuated due to acceleration/deceleration, so that the determination result in the vicinity of the threshold is highly to be frequently switched. Accordingly, it is difficult to set the threshold in such a manner that switching of the frequent determination result can be suppressed. In this embodiment, the power generation start determination, is performed based on the vehicle speed equivalent value obtained by smoothing the vehicle power consumption. Therefore, the vehicle speed is less affected by travelling on an uphill, a downhill, or the like, and the effect of the output fluctuation due to acceleration/deceleration can be suppressed, thereby making it possible to determine the high-output/high-speed travelling state of the vehicle 1 stably and accurately.

While the embodiments of the invention have been described above, the mode of the present invention is not limited to the above embodiments.

For example, in this embodiment, the fuel cell is used as the power generation unit, a unit composed of a combination of an engine and a generator may be used instead of the fuel cell. In this case, the vehicle is a hybrid car which can implement a series mode. Also, in such a vehicle, the generator and the engine are controlled to be driven and the output from the generator is controlled in the same manner as in the output control for the fuel cell described above, thereby making it possible to efficiently actuate the engine and increase the range of the vehicle.

What is claimed is:

1. A power control device for a vehicle in which an electric motor for driving the vehicle to travel is supplied with power from a battery and a power generation unit configured to consume fuel to generate power, the power control device comprising:
   a remaining fuel amount detection unit configured to detect a remaining fuel amount of the power generation unit that supplies power to the electric motor driving the vehicle;
   a power generation start determination unit configured to perform a power generation start determination of the power generation unit;
   a power generation control unit configured to control a power generation output of the power generation unit; and
   a charging rate detection unit configured to detect a current charging rate of the battery,
   wherein the power generation control unit sets a target charging rate of the battery in such a manner that the target charging rate decreases as the remaining fuel amount decreases after the power generation start determination is performed, and controls the power generation output based on a difference between the target charging rate and the current charging rate, and
   wherein the power generation control unit decreases the target charging rate in such a manner that the remaining fuel amount reaches an attainment target remaining fuel amount, which is a remaining fuel amount required when travelling of the vehicle ends, and the target charging rate reaches an attainment target charging rate, which is a charging rate remaining when traveling of the vehicle ends, simultaneously.

2. The power control device for a vehicle according to claim 1, wherein the power generation start determination unit calculates a vehicle speed equivalent value based on the power supplied to the electric motor from the battery, and performs the power generation start determination when the vehicle speed equivalent value exceeds a predetermined threshold.

3. The power control device for a vehicle according to claim 2, wherein the power generation start determination unit calculates the vehicle speed equivalent value by smoothing the power supplied from the battery.

4. The power control device for a vehicle according to claim 1, wherein the power generation unit is a fuel cell.

5. The power control device for a vehicle according to claim 2, wherein the power generation unit is a fuel cell.

6. The power control device for a vehicle according to claim 3, wherein the power generation unit is a fuel cell.

* * * * *